(12) United States Patent
Itagaki et al.

(10) Patent No.: US 7,903,363 B2
(45) Date of Patent: Mar. 8, 2011

(54) SAME WRAP BACKHITCHLESS WRITE METHOD TO ENCODE DATA ON A TAPE STORAGE MEDIUM

(75) Inventors: Hiroshi Itagaki, Kanagawa-Ken (JP);
James Mitchell Karp, Tucson, AZ (US);
Takashi Katagiri, Kanagawa-Ken (JP);
Motoko Oe, Kanagawa (JP); Yutaka Ooishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/134,091

(22) Filed: Jun. 5, 2008

(65) Prior Publication Data
US 2009/0303633 A1    Dec. 10, 2009

(51) Int. Cl.
*G11B 15/18* (2006.01)
*G11B 15/44* (2006.01)

(52) U.S. Cl. .......................... 360/71; 360/72.1; 360/74.1
(58) Field of Classification Search .................. None
See application file for complete search history.

(56) References Cited

U.S. PATENT DOCUMENTS

| | | | |
|---|---|---|---|
| 6,856,479 B2 * | 2/2005 | Jaquette et al. | 360/48 |
| 6,865,043 B2 * | 3/2005 | Ataku et al. | 360/48 |
| 6,950,257 B1 * | 9/2005 | Greco et al. | 360/48 |
| 6,958,878 B2 * | 10/2005 | Jaquette et al. | 360/73.04 |
| 6,970,311 B2 * | 11/2005 | Jaquette | 360/48 |
| 7,107,397 B2 * | 9/2006 | Dahman et al. | 711/113 |
| 7,119,974 B2 * | 10/2006 | Jaquette | 360/48 |
| 7,218,468 B2 * | 5/2007 | Jauette et al. | 360/74.1 |
| 7,236,322 B2 * | 6/2007 | Greco et al. | 360/75 |
| 7,350,021 B2 * | 3/2008 | Itagaki et al. | 360/71 |
| 7,511,915 B2 * | 3/2009 | Greco et al. | 360/75 |
| 7,535,664 B1 * | 5/2009 | Gill | 360/72.2 |
| 7,631,141 B2 * | 12/2009 | Watanabe | 711/111 |

* cited by examiner

*Primary Examiner* — Hoa T Nguyen
*Assistant Examiner* — James L Habermehl
(74) *Attorney, Agent, or Firm* — Dale F. Regelman; Quarles & Brady LLP

(57) ABSTRACT

A method to write information to a tape storage medium by disposing a tape storage medium in a tape drive apparatus comprising a write head. The method moves the tape storage medium in a first direction, writes data from a buffer to the tape storage medium, and thereby empties the buffer while the tape storage medium is moving in the first direction. The method determines, while the tape storage medium is moving in the first direction, whether to enable a backhitchless write wherein the tape storage medium is not stopped and moved in a second and opposition direction, prior to writing new data to the tape storage medium. By not stopping the movement of the tape storage medium, and by not moving the tape storage medium in a reverse direction to reposition the write head, the method eliminates the time overhead required to stop the tape and reposition the tape head. Applicants' method achieves this time efficiency without adverse impact to the nominal storage capacity of the tape information medium.

22 Claims, 16 Drawing Sheets

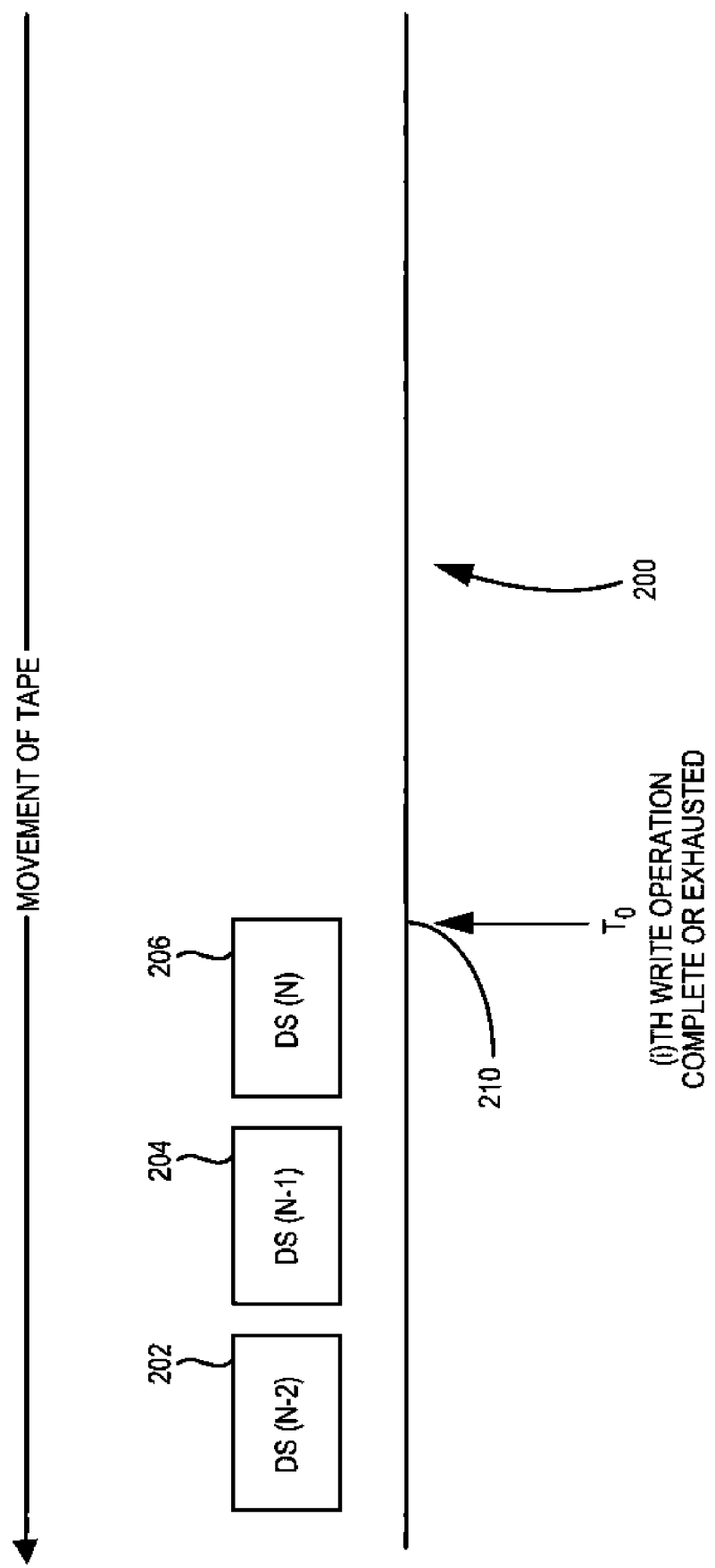

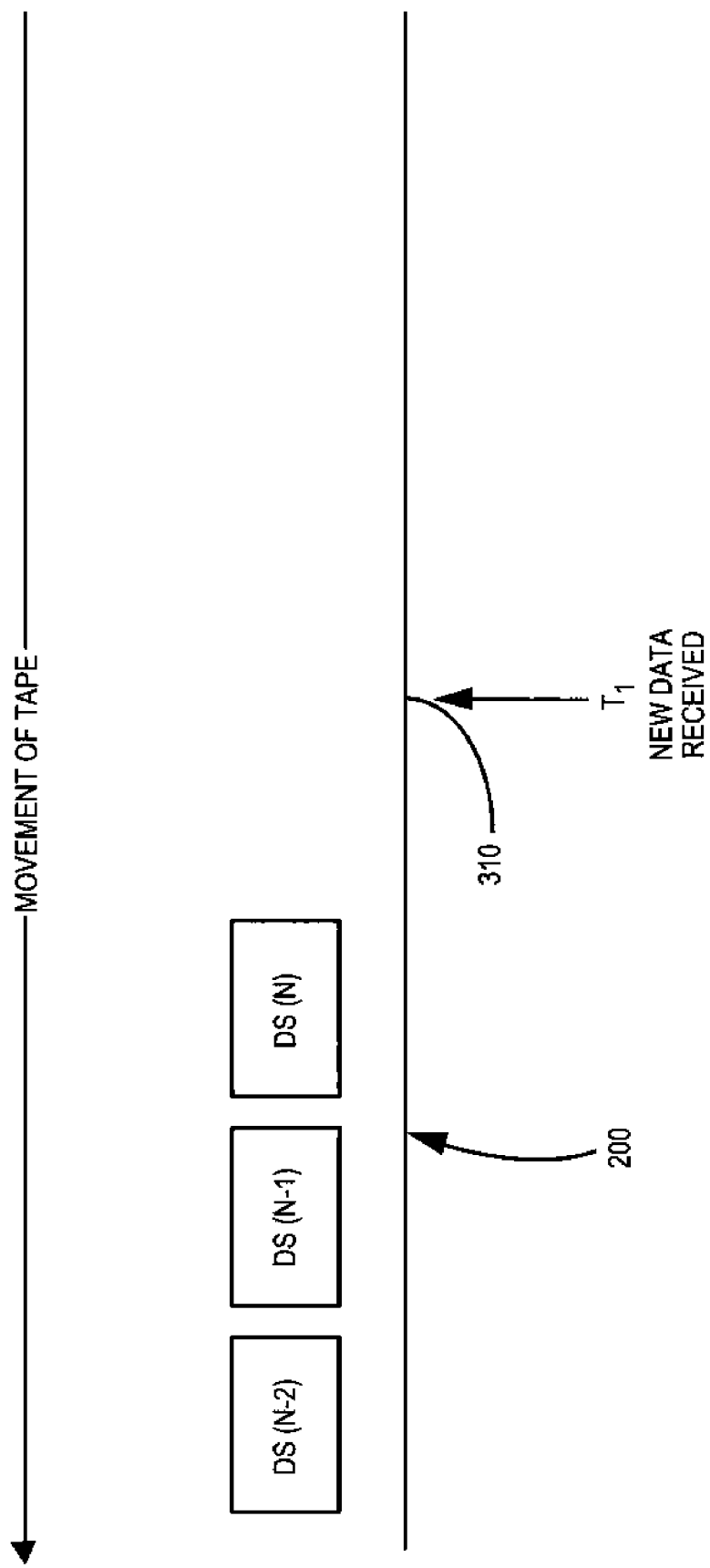

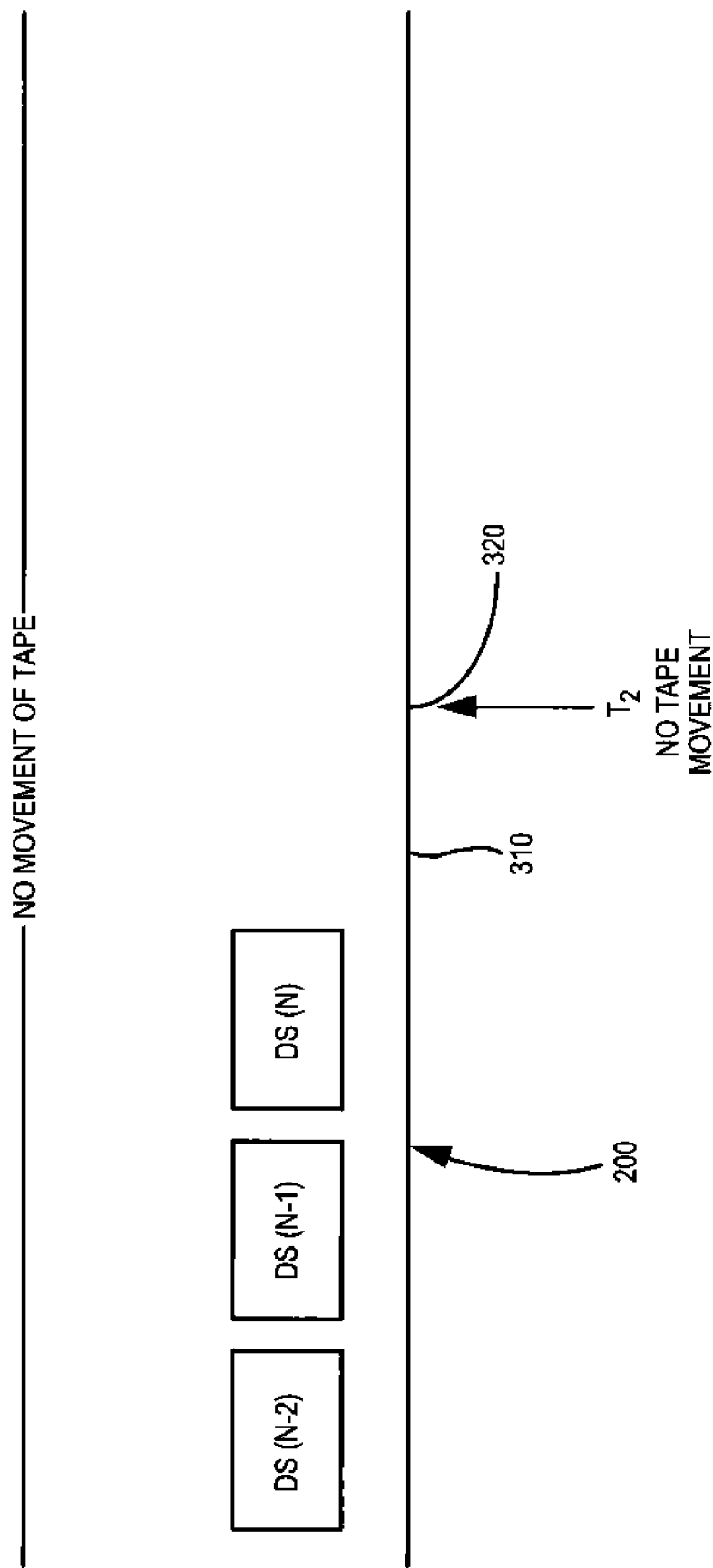

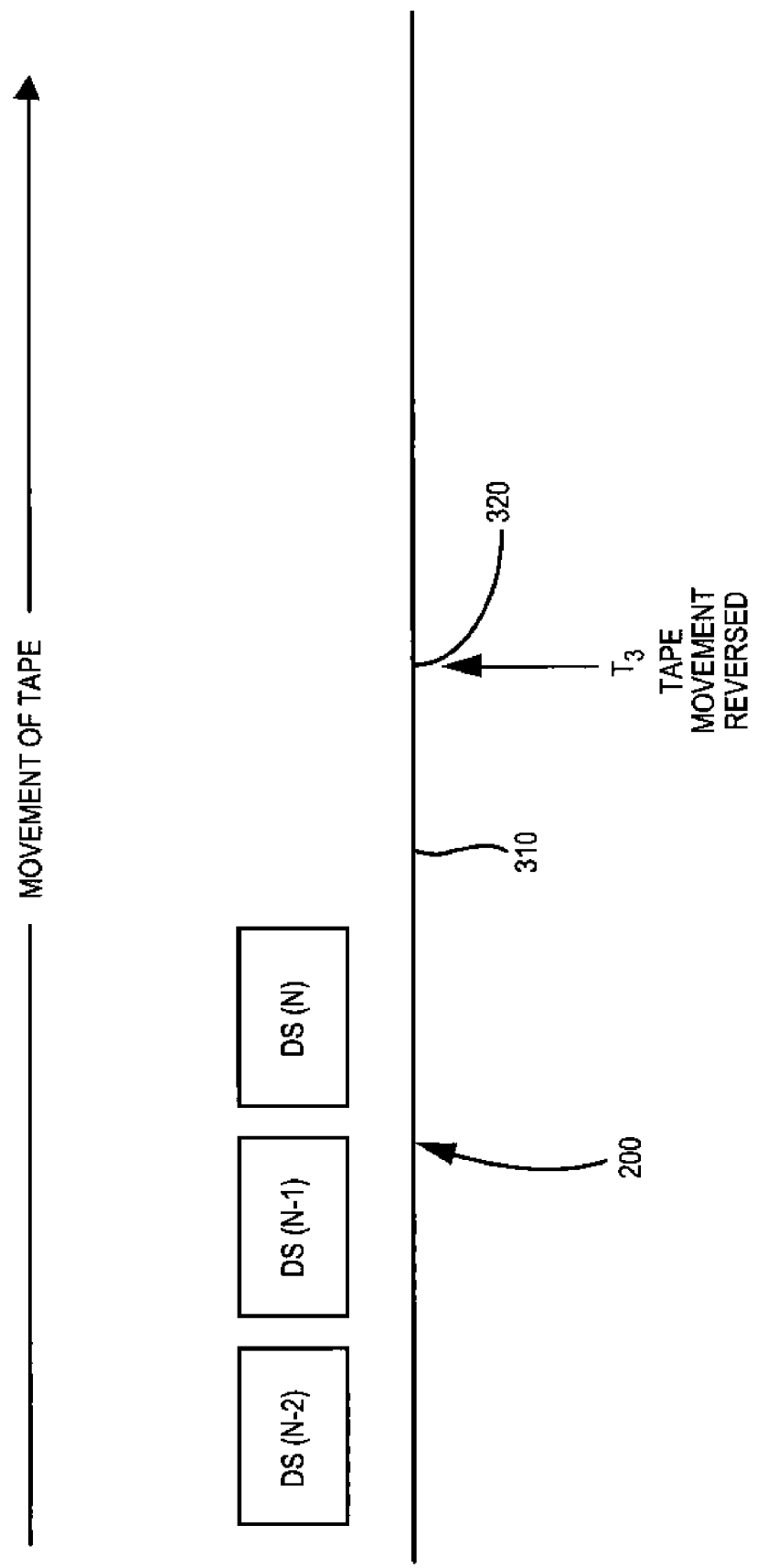

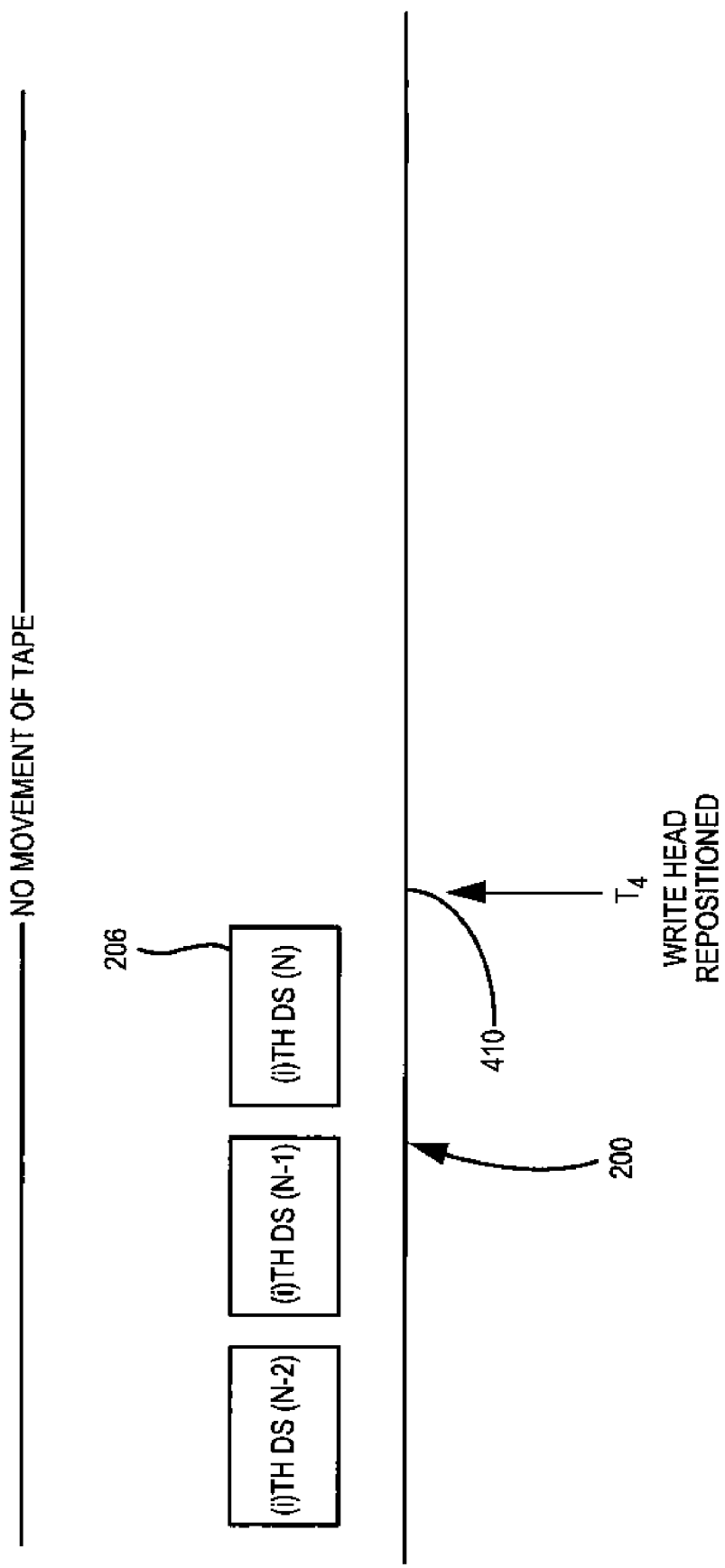

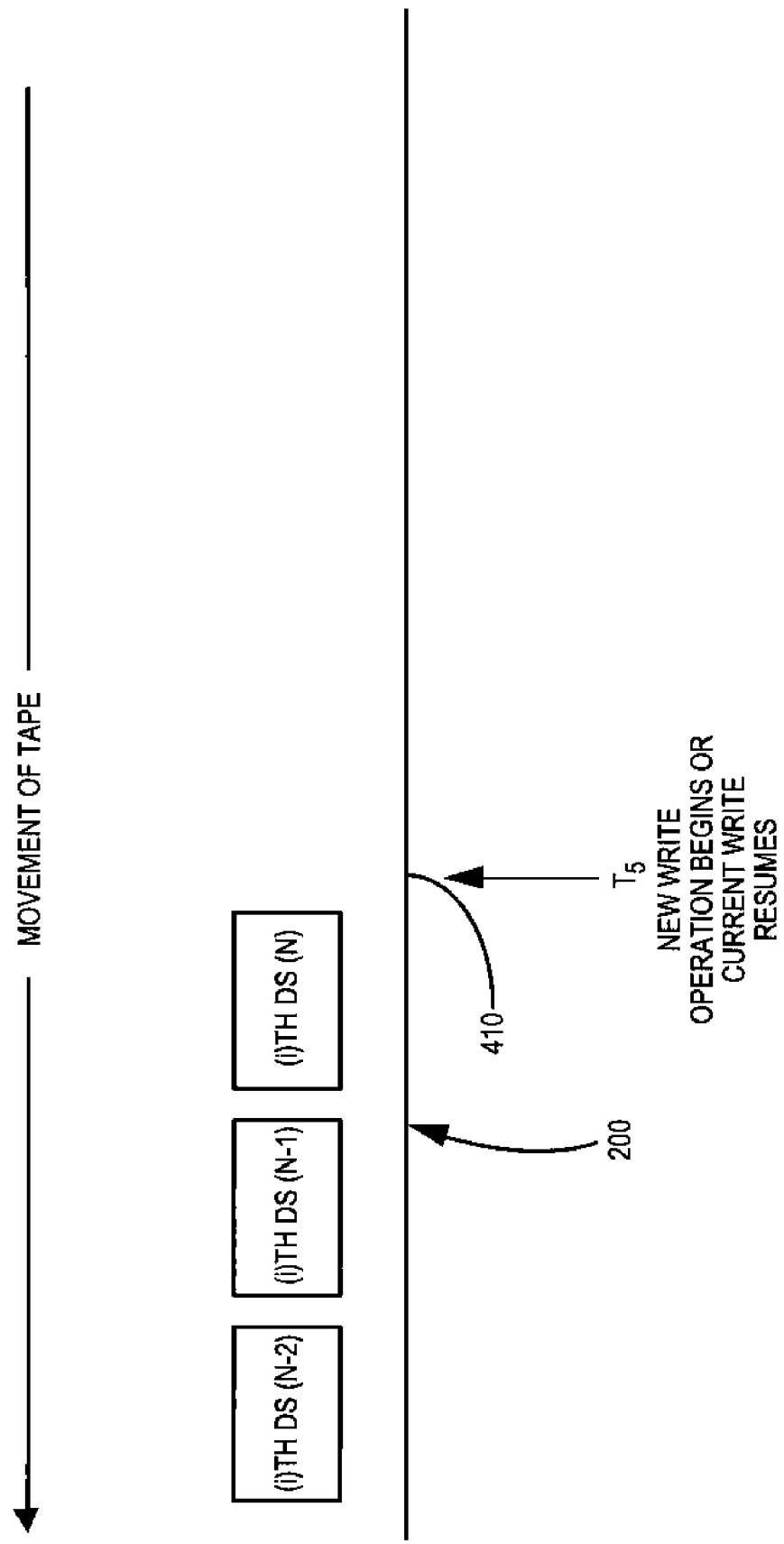

| FIG. 9A |
| FIG. 9B |

SAME WRAP BACKHITCHLESS WRITE METHOD TO ENCODE DATA ON A TAPE STORAGE MEDIUM

FIELD OF THE INVENTION

The invention is directed to a method to write data to a tape storage medium without stopping the tape to reposition a write head between write operations.

BACKGROUND OF THE INVENTION

It is known in the art to save data in automated data storage libraries comprising a plurality of tape storage media and one or more tape drives. Certain prior art methods are time inefficient when writing a plurality of datasets to a tape storage medium. The prior art methods repetitively employ a "backhitch" method wherein a tape drive moves the tape in a first direction while writing a current dataset, stops the movement of the tape, reverses the movement of the tape to reposition a write head adjacent the end of the current dataset, and then once again moves the tape in the first direction to write a new dataset to the tape storage medium.

SUMMARY OF THE INVENTION

The invention comprises a method to write information to a tape storage medium, by disposing a tape storage medium in a tape drive apparatus comprising a write head. The method moves the tape storage medium in a first direction, and completes, or exhausts, a current write operation while the tape storage medium is moving in the first direction. The method determines, while the tape storage medium is moving in the first direction, whether to enable a backhitchless write wherein the tape storage medium is not stopped and moved in a second and opposition direction, prior to beginning writing additional data to the tape storage medium.

By not stopping the movement of the tape storage medium, and by not moving the tape storage medium in a reverse direction to reposition the write head, Applicants' method eliminates the time overhead required to stop the tape and reposition the tape head. Applicants' method achieves this time efficiency without adverse impact to the nominal storage capacity of the tape information medium. By "without adverse impact to the nominal storage capacity of the tape information medium," Applicants mean that use of their method does not decrease the nominal storage capacity of the tape information medium.

In certain embodiments, the method determines an Expected Capacity On Current Location (S), wherein the value of (S) represents the amount of storage capacity that has already been utilized to complete the current and all subsequent write operations to the tape storage medium. In certain embodiments, the method determines an Actual Capacity On Current Location (R), wherein the value of (R) represents total amount of written data from the beginning of storage capacity to the current location In certain embodiments, based upon the Expected Capacity On Current Location (S), and based upon the Actual Capacity On Current Location (R), the tape drive determines whether to enable a backhitchless write wherein the tape storage medium is not stopped and moved in a second and opposition direction, prior to beginning a new write operation, or resuming a current write operation.

BRIEF DESCRIPTION OF THE DRAWINGS

The invention will be better understood from a reading of the following detailed description taken in conjunction with the drawings in which like reference designators are used to designate like elements, and in which:

FIG. 2 is a block diagram illustrating the longitudinal position of a write head with respect to a tape storage medium upon completion of a current write operation;

FIG. 3 is a block diagram illustrating the movement of the tape storage medium of FIG. 2 when receiving a new write operation;

FIG. 4A is a block diagram illustrating a first step in a prior art backhitch write method;

FIG. 4B is a block diagram illustrating a second step in a prior art backhitch write method;

FIG. 4C is a block diagram illustrating a third step in a prior art backhitch write method;

FIG. 4D is a block diagram illustrating a fourth step in a prior art backhitch write method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 8:
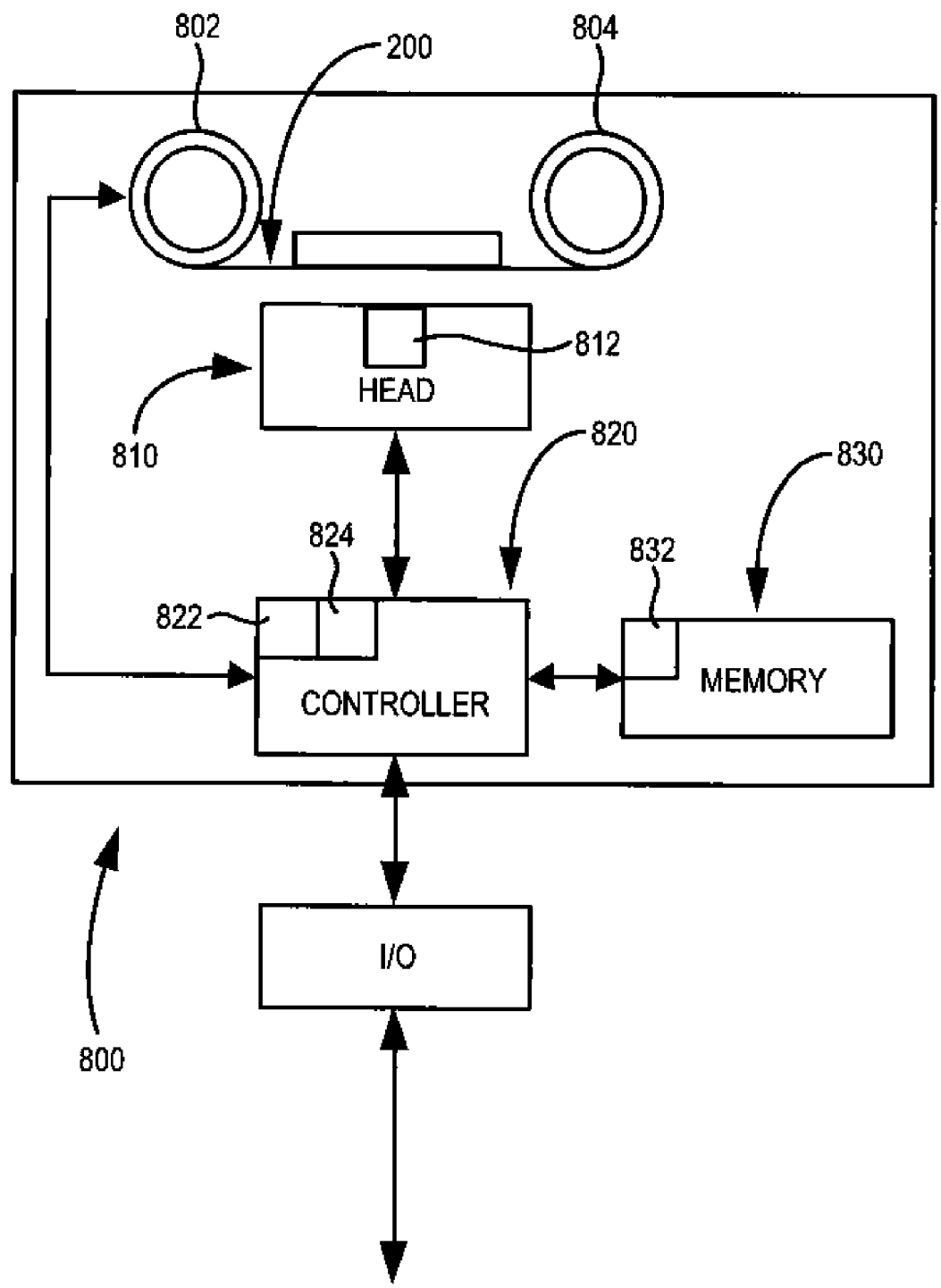
FIG. 8 is a block diagram illustrating Applicants' tape drive apparatus.

Referring now to FIG. 8, when writing data to a magnetic tape storage medium, such as magnetic tape 200 (FIGS. 2, 3, 4A, 4B, 4C, 4D, 8), a portion of the tape medium is disposed on a first rotatable reel, such as reel 802, and a portion of the tape medium is disposed on a second rotatable reel, such as reel 804. The rotatable reels are moved such that tape storage medium 200 is moved from one reel, past tape head 810, and onto to the other reel. Tape head 810 comprises write head 812, wherein write head 812 encodes information in tape storage medium 200 as that medium travels past write head 812. As those skilled in the art will appreciate, tape head 810 may comprise other elements and components not shown in FIG. 8.

In the illustrated embodiment of FIG. 8, tape head 810 is in communication with controller 820. In certain embodiments, controller 820 is integral with tape head 810. Further in the illustrated embodiment of FIG. 8, controller comprises processor 822 and data buffer 824. Controller 820 is in communication with computer readable medium 830. Instructions 832 is encoded in computer readable medium 830.

In certain embodiments, computer readable medium 830 is integral with controller 820. In the illustrated embodiment of FIG. 8, reel 802, reel 804, tape head 810, controller 820, and computer readable medium 830 are disposed within tape drive apparatus 800. As those skilled in the art will appreciate, tape drive apparatus 800 may comprise other elements and components not shown in FIG. 8.

Referring now to FIG. 2, tape storage medium 200 (FIGS. 2, 3, 4A, 4B, 4C, 4D, 8) is moving in direction shown. In the illustrated embodiment of FIG. 2, dataset 202 was first written to tape storage medium 200, then dataset 204 was written to tape storage medium 200, and finally dataset 206 was written to tape storage medium 200. Dataset 206 comprises the last, i.e. the (N)th dataset, in a write operation. At time $T_0$, the current write operation is complete, and a write head, such as write head 812 (FIG. 8), is longitudinally positioned at location 210 with respect to tape storage medium 200 (FIGS. 2, 3, 4A, 4B, 4C, 4D, 8).

Referring now to FIG. 3, at time $T_1$, wherein time $T_1$ is subsequent to time $T_0$, a new write operation is received by a tape drive apparatus, such as tape drive apparatus 800 (FIG. 8), having tape 200 removeably disposed therein. In certain embodiments, the tape drive apparatus receives the new write operation from an interconnected host computer. At time $T_1$, the write head is longitudinally positioned at location 310 along tape storage medium 200.

FIGS. 4A, 4B, 4C, and 4D, illustrate a prior art "backhitch" method the movement of a tape medium in a first direction is stopped because host issues sync command, for example a writefm non-immediate command, to finish the first write operation, the tape medium is then moved in a second and opposite direction, and the tape medium is again stopped such that the write head is positioned adjacent a previously-written dataset received in the current write operation, and the tape medium is again moved in the first direction while writing a new dataset received in a new write operation. Referring now to FIG. 4A, at time $T_2$, wherein time $T_2$ is subsequent to time $T_1$, the tape drive apparatus stops the movement of tape storage medium 200 (FIGS. 2, 3, 4A, 4B, 4C, 4D, 8) in preparation for executing the new write operation. Referring now to FIG. 4B, at time $T_3$, wherein time $T_3$ is subsequent to time $T_2$, the tape drive apparatus moves the tape storage medium 200 (FIGS. 2, 3, 4A, 48, 4C, 4D, 8) in a second, and opposite, direction. Referring now to FIG. 4C, at time $T_4$, wherein time $T_4$ is subsequent to time $T_3$, the tape drive apparatus stops the movement of tape storage medium 200 such that the write head is longitudinally positioned at location point 410 along tape storage medium 200, wherein location 410 is adjacent the end of dataset 206. Referring now to FIG. 4D, at time $T_5$, wherein time $T_5$ is subsequent to time $T_4$, the tape drive apparatus moves tape storage medium 200 in the first direction, and the write head begins to encode the new dataset into that tape storage medium.

Figure 5:
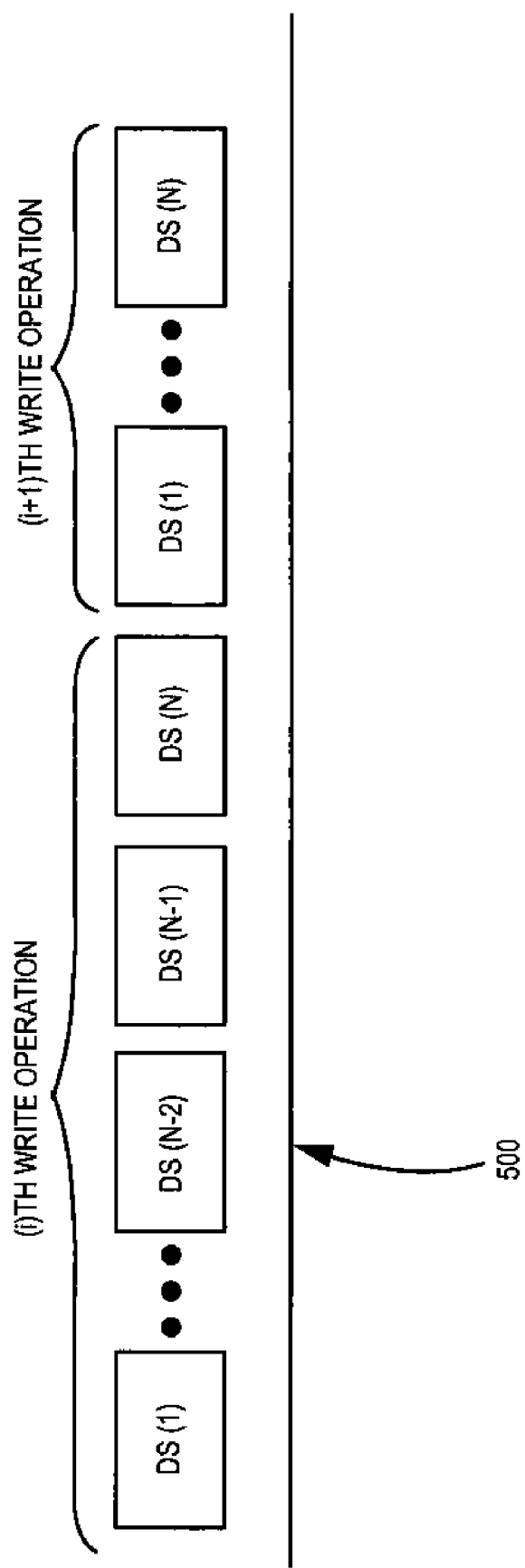
FIG. 5 is a block diagram illustrating a first plurality of datasets written to the tape medium of FIG. 2 in an (i)th write operation and a second plurality of datasets written to the tape medium in an (i+1)th write operation using the prior art method of FIGS. 4A, 4B, 4C, and 4D.

The "backhitch" method of FIGS. 4A, 4B, 4C, and 4D, requires a backhitch time interval $\Delta T_{BACKHITCH}$ to complete, wherein $\Delta T_{BACKHITCH}$ starts at time $T_1$, when a new dataset is received, and ends at time $T_5$, when a new dataset is first written to the tape storage medium. FIG. 5 illustrates encoded tape 500 written using the prior art backhitch method illustrated in FIGS. 2, 3, 4A, 4B, 4C, and 4D.

Applicants have found that the backhitch time interval $\Delta T_{BACKHITCH}$ is often as long as about 3 seconds. As those skilled in the art will appreciate, if host issues a total of (M) sync command, and the tape drive uses the prior art backhitch method (M) times, then an overhead equal to [(M)*3] seconds is used to repetitively reposition the write head. In certain embodiments, Applicants' method to write information to a tape storage medium does not utilize the prior art backhitch process.

Figure 6:
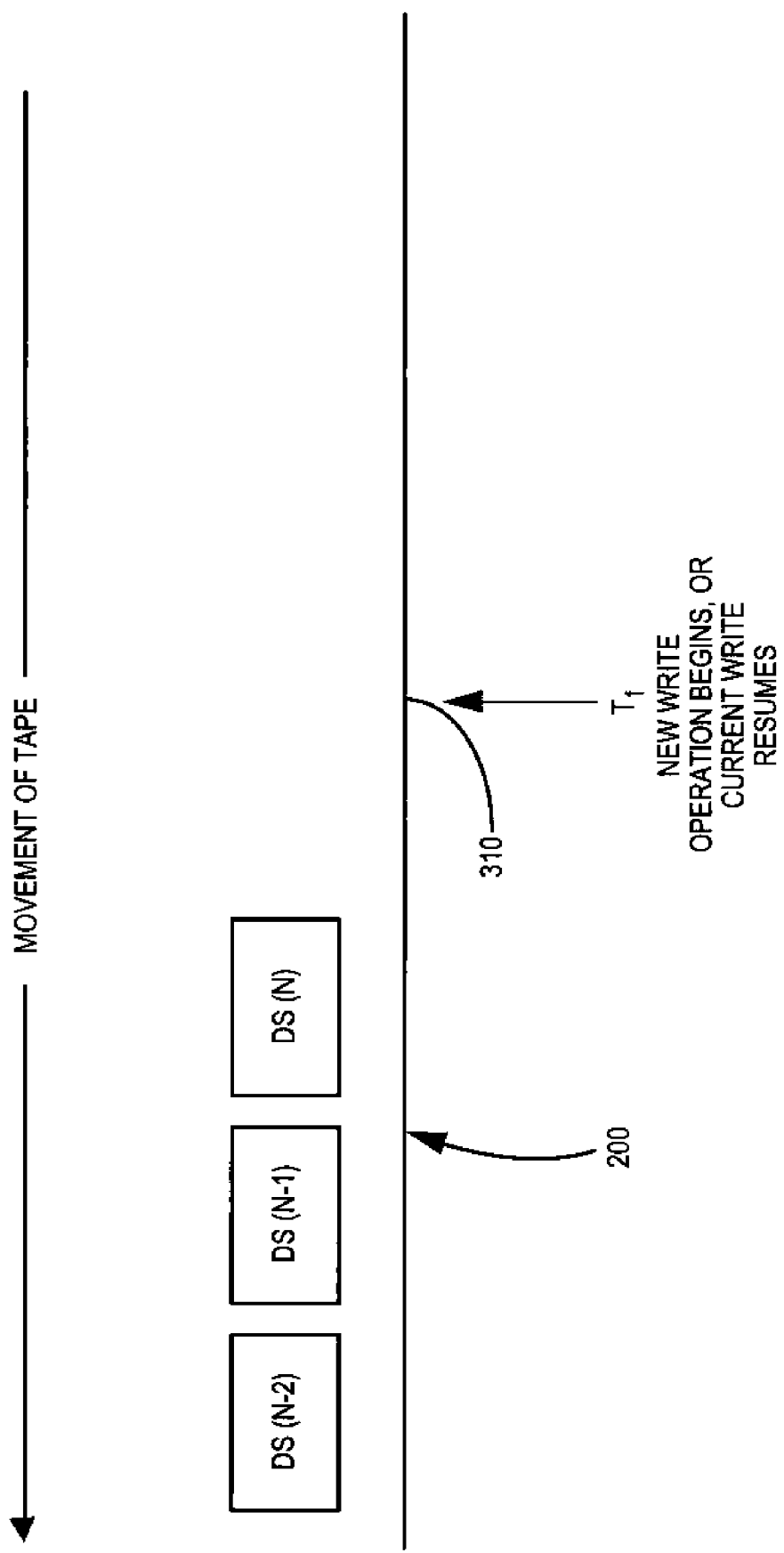
FIG. 6 is a block diagram illustrating Applicants' backhitchless write method.
Figure 7:
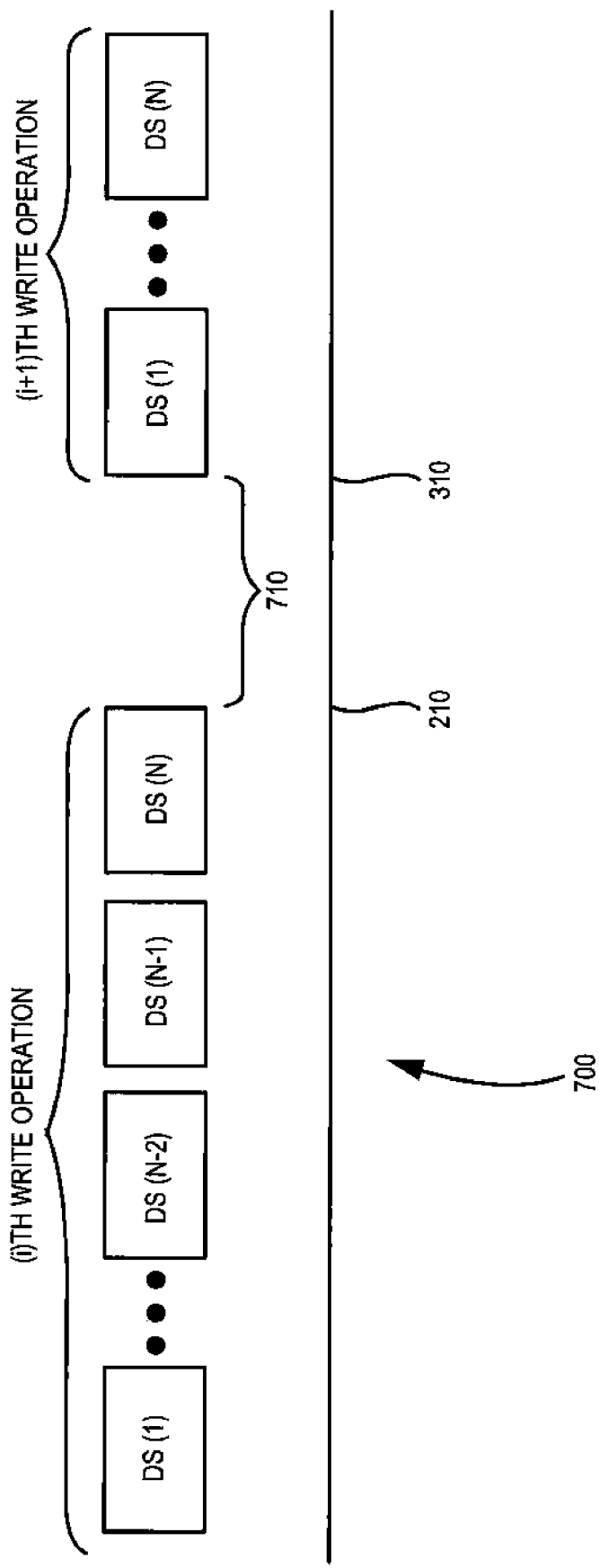
FIG. 7 is a block diagram illustrating a first plurality of datasets written to the tape medium of FIG. 2 in an (i)th write operation and a second plurality of datasets written to the tape medium in an (i+1)th write operation using Applicants' backhitchless write method.

Applicants' method transitions from FIG. 3 wherein a new dataset is received at time $T_1$ to FIG. 6 wherein Applicants' method at time $T_1$ begins to write that new dataset to the tape storage medium. FIG. 7 illustrates encoded tape 700 written using Applicants' method illustrated in FIGS. 2, 3, and 6. Applicants' method results in a loss of tape storage capacity equal to distance 710 comprising the unused portion of tape 700 disposed between the end of the (N)th dataset in the (i)th write operation and the beginning of the (N+1)th dataset in the (i+1)th write operation.

Applicants have found that a tape storage medium actually comprises more storage capacity than its nominal storage capacity. As a general matter, a typical tape storage medium comprises some additional storage capacity (for example, 7% to the nominal capacity). As an example, a 500 gigabyte tape storage medium actually comprises about 535 gigabytes of useable storage capacity.

As noted above, use of Applicants' backhitchless write method saves time when drive receives multiple transaction data followed by sync command. Applicants have further discovered that the time advantage realized using their backhitchless write method does not necessarily result in a use of less than the nominal storage capacity of the tape storage medium. Rather, the storage capacity loss resulting from use of Applicants' backhitchless write method only decreases the amount of additional storage capacity that exceeds the nominal storage capacity.

Figure 1:
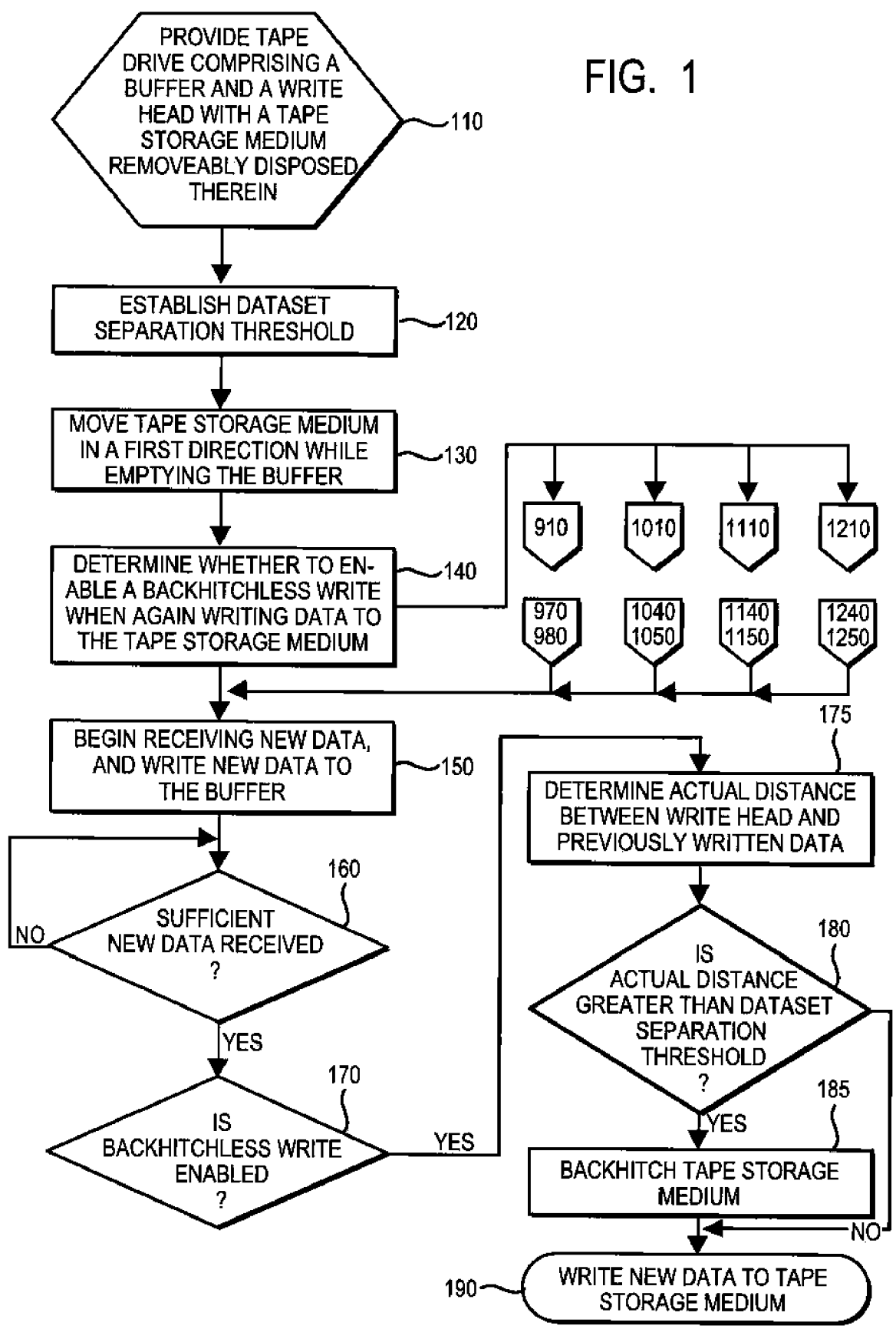
FIG. 1 is a flow chart summarizing certain of the steps of Applicants' method.

FIG. 1 summarizes the steps of Applicants' method. Referring now to FIG. 1, in step 110 the method provides a tape drive apparatus, such as tape drive apparatus 800 (FIG. 8), with a tape storage medium, such as tape storage medium 200 (FIGS. 2, 3, 4A, 4B, 4C, 4D, 8), removeably disposed therein. In step 120, the method establishes a Dataset Separation Threshold, wherein that Dataset Separation Threshold is used to determine whether to implement Applicants' backhitchless write method described hereinabove. In certain embodiments, step 120 is performed by the manufacturer of the tape drive apparatus. In certain embodiments, step 120 is performed by the manufacturer of the tape storage medium. In certain embodiments, step 120 is performed by the manufacturer of an automated data storage library comprising the tape drive apparatus. In certain embodiments, step 120 is performed by a host computer in communication with the tape drive apparatus.

In step 130, the method completes or exhausts a current write operation. In certain embodiments, in step 130 a write head disposed in the tape drive apparatus of step 110 completes encoding a current write operation to the tape storage medium of step 102. In other embodiments, the transfer rate from a data buffer, such as buffer 824 (FIG. 8) to the write head exceeds the transfer rate of data from a host computer to the tape drive, wherein the data buffer is emptied. In these embodiments, a current write operation is not completed, however, that current write operation is temporarily exhausted until additional data is received from the host computer.

In step 140, the method determines whether to enable use of Applicants' backhitchless write method, described hereinabove, when beginning a new write operation, or resuming a current write operation. In certain embodiments, the tape drive apparatus performs step 140.

Figures 9, 9A:
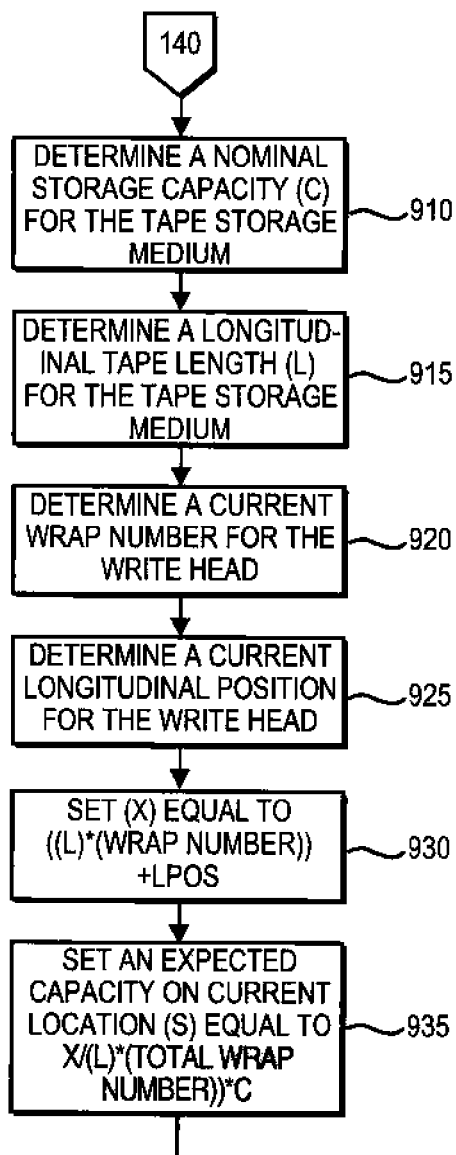
FIG. 9A is a flowchart summarizing steps in one embodiment of Applicants' method.
Figure 9B:
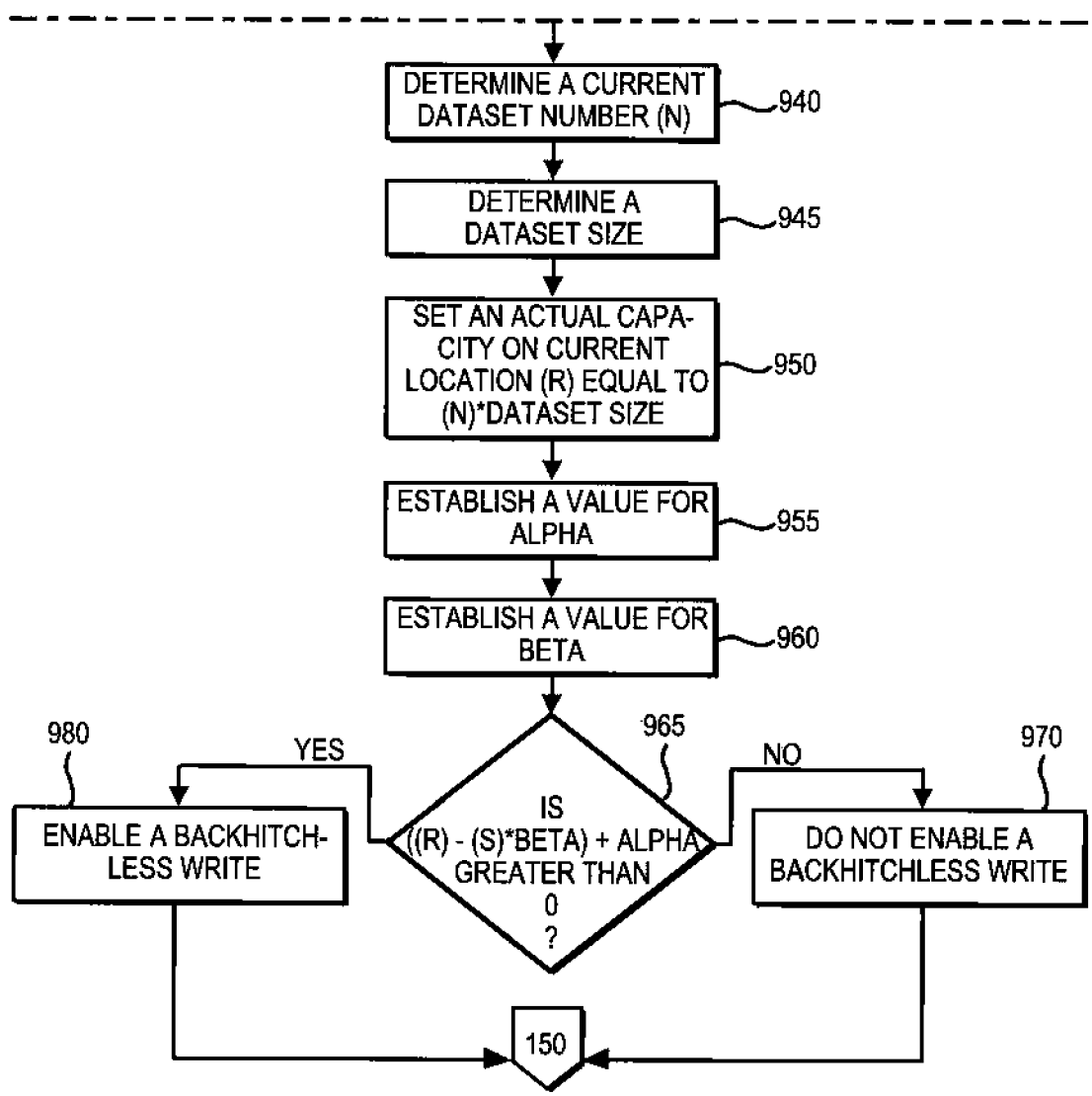
FIG. 9B is a flowchart summarizing additional steps in one embodiment of Applicants' method.

In certain embodiments, step 140 comprises the steps recited in FIG. 9. Referring now to FIG. 9, in steps 910 through 935 the method determines an Expected Capacity On Current Location (S), wherein the value of (S) represents the amount of storage capacity that has already been utilized to complete the current and all subsequent write operations to the tape storage medium. In certain embodiments, the tape drive apparatus of step 110 performs steps 910 through 935, inclusive. In steps 940 through 950, the method determines an Actual Capacity On Current Location (R), wherein the value of (R) represents total amount of written data from the beginning of storage capacity to the current location. In certain embodiments, the tape drive of step 110 performs steps 940 through 950, inclusive.

If the current write operation and all subsequent write operations to the tape storage medium were performed without any error, and without using any backhitchless writes, then (S) would equal (R). On the other hand and as described hereinabove, each backhitchless write operation results in a storage capacity loss, such as storage capacity loss 710 (FIG. 7). Use of a single backhitchless write operation results in (S) being greater than (R).

In step 910 the method determines a nominal storage capacity (C) for the tape storage medium. In certain embodiments, step 910 is performed by a tape drive apparatus. In step 915, the method determines a longitudinal tape length (L) for the tape storage medium. In certain embodiments, step 915 is performed by a tape drive apparatus.

In step 920, the method determines a current wrap number for the write head. In certain embodiments, step 920 is performed by a tape drive apparatus. As those skilled in the art will appreciate, data is written to a magnetic tape using a plurality of write heads, wherein the tape is first moved in a first direction from the BOT to the EOT while writing a first plurality of data tracks. The direction of the tape is then reversed, and the tape is moved in a second and opposite direction while a second plurality of data tracks are written starting at the EOT and ending at the BOT. The first plurality of data tracks comprise a first "wrap." The second plurality of data tracks comprise a second "wrap." A fully encoded tape storage medium comprises a plurality of wraps.

In step 925, the method determines a current longitudinal position for the write head. In certain embodiments, step 925 is performed by a tape drive apparatus. As those skilled in the art will appreciate, in certain embodiments the tape storage medium of step 102 (FIG. 1) is encoded with a plurality of servo bands written along the length (L) of the tape in non-data regions. A plurality of sequential servo patterns disposed in a servo band encode linear position ("LPOS") information. In certain embodiments, step 925 comprises decoding a plurality of servo patterns to determines the LPOS position of the write head of step 110 (FIG. 1).

In step 930, the method calculates a parameter (X) for the tape head, wherein (X) is set equal to the multiplication product of the Longitudinal Tape Length (L) of step 915 and the Current Wrap Number of step 920, plus the Current Longitudinal Position of step 925. In certain embodiments, step 930 is performed by a tape drive apparatus.

In step 935, the method sets the Expected Capacity On Current Location (S) equal to (X/(L)*(Total Wrap Number))*C. In certain embodiments, step 935 is performed by a tape drive apparatus.

In step 940, the method determines a current dataset number (N). In certain embodiments, step 940 is performed by a tape drive apparatus. In step 945, the method determines a Dataset Size. In certain embodiments, step 945 is performed by a tape drive apparatus. In step 950, the method calculates an Actual Capacity On Current Location (R) equal to the multiplication product of the current dataset number of step 940 and the dataset size of step 945.

In step 955, the method establishes a value for Alpha, wherein the parameter Alpha is used to determine whether to implement Applicants' backhitchless write method described hereinabove. In certain embodiments, the method sets Alpha equal to about 5 GB in step 955. In certain embodiments, step 955 is performed by the manufacturer of the tape drive apparatus. In certain embodiments, step 955 is performed by the manufacturer of the tape storage medium. In certain embodiments, step 955 is performed by the manufacturer of an automated data storage library comprising the tape drive apparatus. In certain embodiments, step 955 is performed by a host computer in communication with the tape drive apparatus.

In step 960, the method establishes a value for Beta, wherein the parameter Beta is used to determine whether to implement Applicants' backhitchless write method described hereinabove. In certain embodiments, the method sets Beta equal to about 1.05 in step 960. In certain embodiments, step 960 is performed by the manufacturer of the tape drive apparatus. In certain embodiments, step 960 is performed by the manufacturer of the tape storage medium. In certain embodiments, step 960 is performed by the manufacturer of an automated data storage library comprising the tape drive apparatus. In certain embodiments, step 960 is performed by a host computer in communication with the tape drive apparatus.

In step 965, the method determines if (R)−(S)*Beta+Alpha is greater than 0. In certain embodiments, step 965 is performed by the tape drive of step 910. If the method determines in step 965 that (R)−(S)*Beta+Alpha is greater than 0, then the method transitions to step 980 and enables use of Applicants' backhitchless write method when beginning a new write operation, or resuming a current write operation. Alternatively, if the method determines in step 965 that (R)−(S)*Beta+Alpha is not greater than 0, then the method transitions to step 970 and does not enable use of Applicants' backhitchless write method.

The following examples are presented to further illustrate to persons skilled in the art how to use Applicants' method. These examples are not intended as limitations, however, upon the scope of the invention.

EXAMPLE I

If (R) and (S) both equal 90 Gigabytes ("GB"), and if Alpha is set to 5 GB and Beta is set to 1.05, then [(R)−(S)*Beta+

Alpha] equals +0.5 GB, and therefore the method would elect in step 110 to enable a backhitchless write in step 118.

EXAMPLE II

If (R) and (S) both equal 200 Gigabytes ("GB"), and if Alpha is set to 5 GB and Beta is set to 1.05, then [(R)−(S)*Beta+Alpha] equals −5 GB, and therefore the method would elect in step 110 not to enable use of Applicants' backhitchless write method.

As Examples I and II illustrate, the method of FIG. 9 enables use of Applicants' backhitchless write method when writing data to a tape storage medium relatively near the beginning of tape ("BOT"), but not near the end of tape ("EOT"). Use of their backhitchless write method near the BOT ensures that most of the additional storage capacity over the nominal storage capacity of the tape medium remains available for use. Therefore, the time advantage realized using Applicants' backhitchless write method does not result in a loss of nominal storage capacity of the information storage medium. On the other hand, use of Applicants' backhitchless write method near the EOT might mean that the time advantage realized could result in a loss of nominal storage capacity.

Figure 10:
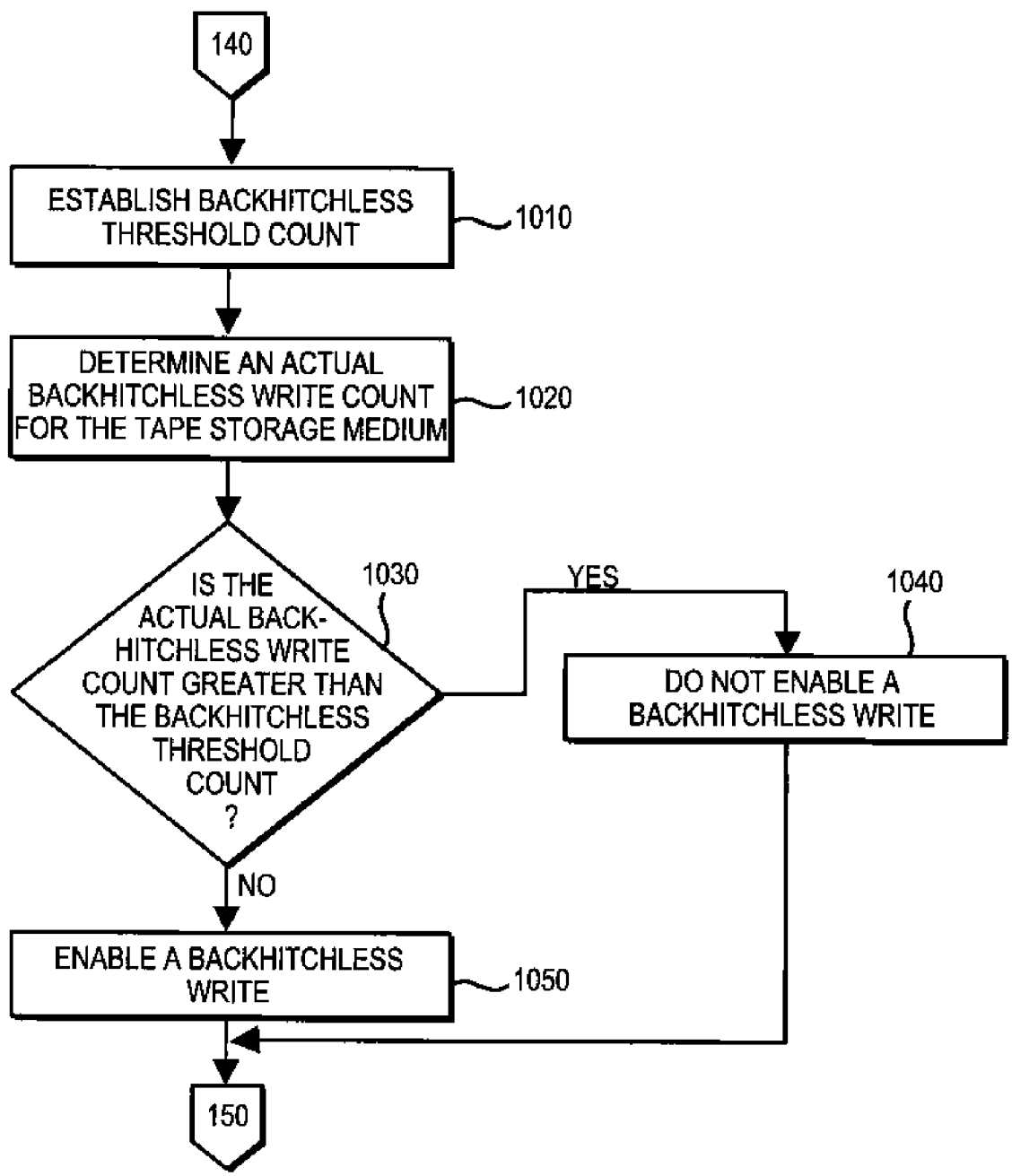
FIG. 10 is a flowchart summarizing additional steps in a second embodiment of Applicants' method.

In certain embodiments, step 140 comprises the steps recited in FIG. 10. Referring now to FIG. 10, in step 1010 the method establishes a Backhitchless Threshold Count comprising a maximum number of permitted backhitchless write operations for the tape storage medium of step 110 (FIG. 1). In certain embodiments, the Backhitchless Threshold Count of step 1010 is established by the manufacturer of the tape storage medium of step 110. In certain embodiments, the Backhitchless Threshold Count of step 1010 is established by the manufacturer of the tape drive of step 110.

In step 1020, the method determines an Actual Backhitchless Write Count for the tape storage medium of step 110 comprising the number of backhitchless write operations already performed during the current write operation and all subsequent write operations to the tape storage medium. In certain embodiments, step 1020 is performed by the tape drive of step 110 (FIG. 1).

In step 1030, the method determines if the Actual Backhitchless Write Count of step 1020 is greater than the Backhitchless Threshold Count of step 1020. If the method determines in step 1030 that the Actual Backhitchless Write Count of step 1020 is greater than the Backhitchless Threshold Count of step 1020, then the method transitions from step 1030 to step 1040 and does not enable use of Applicants' backhitchless write method when beginning a new write operation, or resuming a current write operation. Alternatively, if the method determines in step 1030 that the Actual Backhitchless Write Count of step 1020 is not greater than the Backhitchless Threshold Count of step 1020, then the method transitions from step 1030 to step 1050 and enables use of Applicants' backhitchless write method when beginning a new write operation, or resuming a current write operation.

Figure 11:
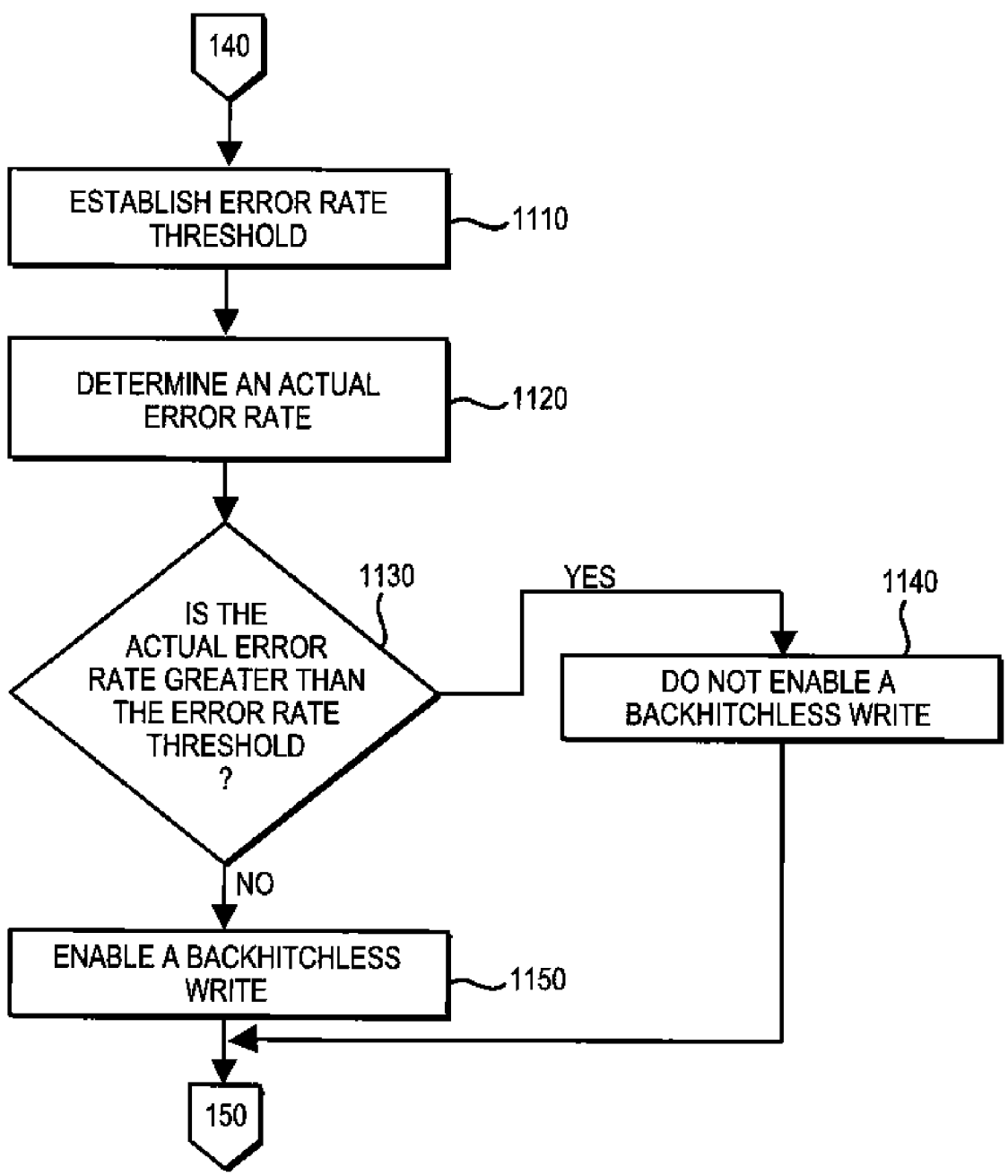
FIG. 11 is a flowchart summarizing additional steps in a third embodiment of Applicants' method.

In certain embodiments, step 140 (FIG. 1) comprises the steps recited in FIG. 11. Referring now to FIG. 11, in step 1110 the method establishes an Error Rate Threshold comprising a maximum error rate permitted when using backhitchless write operations for the tape storage medium of step 110 (FIG. 1). In certain embodiments, the Error Rate Threshold of step 1110 is established by the manufacturer of the tape storage medium of step 110. In certain embodiments, the Error Rate Threshold of step 1110 is established by the manufacturer of the tape drive of step 110.

In step 1120, the method determines an Actual Error Rate for the tape storage medium of step 110. In certain embodiments, step 1120 is performed by the tape drive of step 110 (FIG. 1).

In step 1130, the method determines if the Actual Error Rate of step 1120 is greater than the Error Rate Threshold of step 1110. If the method determines in step 1030 that the Actual Error Rate of step 1120 is greater than the Error Rate Threshold of step 1110, then the method transitions from step 1130 to step 1140 and does not enable use of Applicants' backhitchless write method when beginning a new write operation, or resuming a current write operation. Alternatively, if the method determines in step 1130 that Actual Error Rate of step 1120 is not greater than the Error Rate Threshold of step 1110, then the method transitions from step 1130 to step 1150 and enables use of Applicants' backhitchless write method when beginning a new write operation, or resuming a current write operation.

Figure 12:
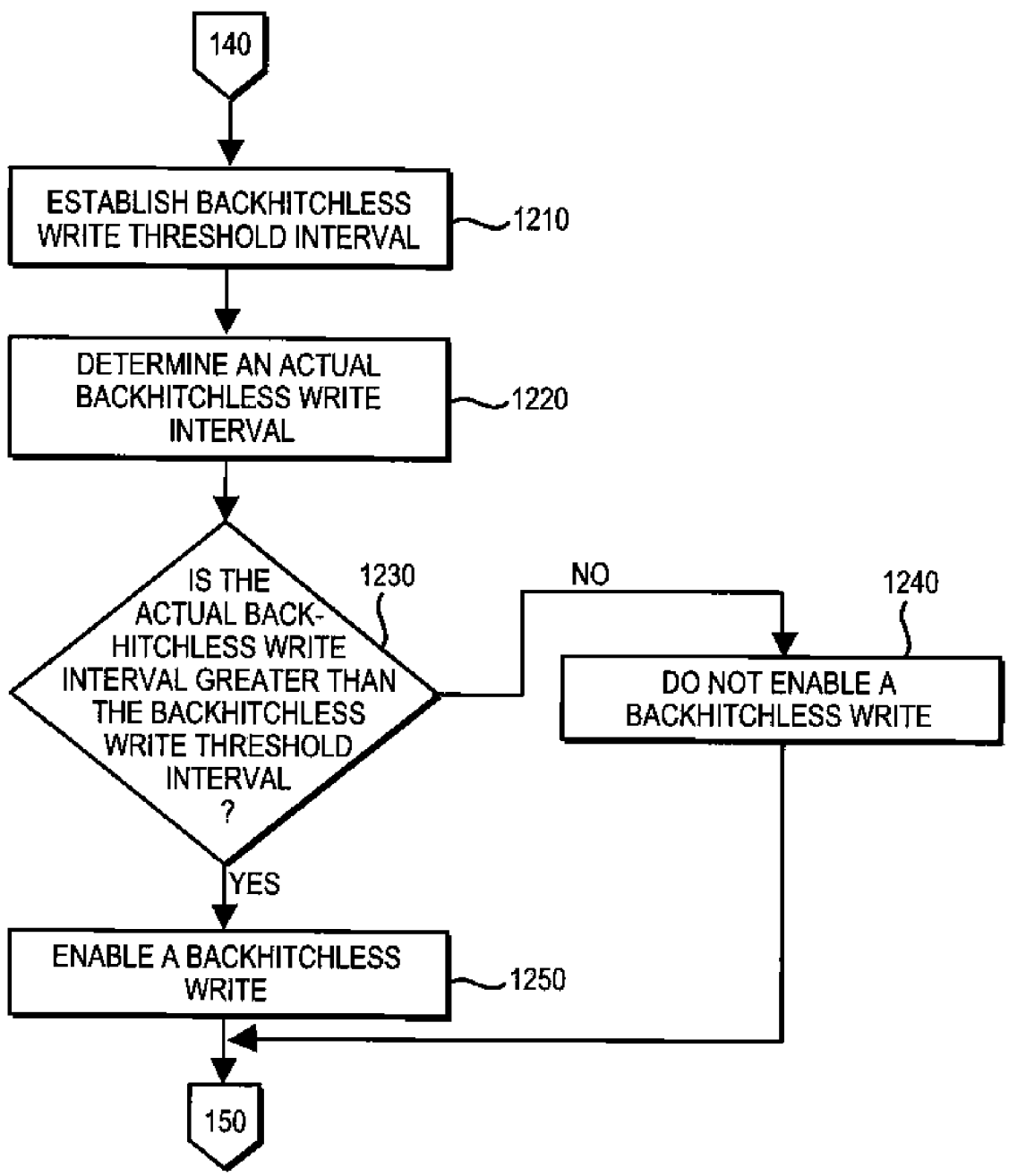
FIG. 12 is a flowchart summarizing additional steps in a fourth embodiment of Applicants' method.

In certain embodiments, step 140 (FIG. 1) comprises the steps recited in FIG. 12. Referring now to FIG. 12, in step 1210 the method establishes a Backhitchless Write Threshold Interval comprising a minimum tape length between allowed backhitchless write operations for the tape storage medium of step 1101 (FIG. 1). In certain embodiments, the Backhitchless Write Threshold Interval of step 1210 is established by the manufacturer of the tape storage medium of step 110. In certain embodiments, the Backhitchless Write Threshold Interval of step 1210 is established by the manufacturer of the tape drive of step 110.

In step 1220, the method determines an Actual Backhitchless Write Interval for the tape storage medium of step 110 comprising the actual tape length between the current write head position and the last backhitchless write operation. In certain embodiments, step 1220 is performed by the tape drive of step 110 (FIG. 1).

In step 1130, the method determines if the Actual Backhitchless Write Interval of step 1220 is greater than the Backhitchless Write Threshold Interval of step 1210. If the method determines in step 1030 that the Actual Backhitchless Write Interval of step 1220 is not greater than the Backhitchless Write Threshold Interval of step 1210, then the method transitions from step 1230 to step 1240 and does not enable use of Applicants' backhitchless write method when beginning a new write operation, or resuming a current write operation. Alternatively, if the method determines in step 1230 that the Actual Backhitchless Write Interval of step 1220 is greater than the Backhitchless Write Threshold Interval of step 1210, then the method transitions from step 1230 to step 1250 and enables use of Applicants' backhitchless write method when beginning a new write operation, or resuming a current write operation.

Referring once again to FIG. 1, in step 150 the method begins receiving a new write operation or resumes receiving data comprising a current write operation, and begins writing a that newly-received data to a data buffer, such as buffer 824 (FIG. 8), in the tape drive apparatus. In certain embodiments, step 150 is performed by a tape drive apparatus.

In step 160, the method determines if sufficient new data has been received to begin a new write operation, or resume a current write operation. In certain embodiments, step 160 is performed by a tape drive apparatus. If the method determines in step 160 that insufficient new data has been received to begin a new write operation, or to resume a current write operation, then the method pauses at step 160 while receiving additional new data.

If the method determines in step 160 that sufficient new data has been received to begin a new write operation, or to resume a current write operation, then the method transitions from step 160 to step 170 wherein the method determines if a backhitchless write is enabled. In certain embodiments, step 170 is performed by a tape drive apparatus.

If the method determines in step 170 that a backhitchless write is enabled in step 140 then the method transitions from step 170 to step 175 wherein the method determines the Actual Distance between the write head and the end of the last previously-written data. In certain embodiments, step 175 is performed by a tape drive apparatus. In step 180, the method determines if the Actual Distance determined in step 175 is greater than the Dataset Separation Threshold of step 120. In certain embodiments, step 180 is performed by a tape drive apparatus.

If the method determines in step 180 that the Actual Distance determined in step 175 is greater than the Dataset Separation Threshold of step 120, then the method transitions from step 180 to step 185 wherein the method backhitches the tape storage medium. In certain embodiments, step 185 is performed by a tape drive apparatus. By "backhitches the tape storage medium," Applicants mean the method implements the tape movement shown and described in FIGS. 4A, 4B, 4C, and 4D. The method transitions from step 185 to step 190 wherein the method begins writing the new data to the tape storage medium. In certain embodiments, step 190 is performed by a tape drive apparatus.

If the method determines in step 180 that the Actual Distance determined in step 175 is not greater than the Dataset Separation Threshold of step 120, then the method transitions from step 180 to step 190 and using Applicants' backhitchless write method begins writing the new data to the tape storage medium.

If the method determines in step 170 that a backhitchless write is not enabled then the method transitions from step 170 to step 185 and continues as described herein.

In certain embodiments, individual steps recited in FIGS. 1, 9, 10, 11, and/or 12, may be combined, eliminated, or reordered.

In certain embodiments, Applicants' invention includes instructions, such as instructions 832 (FIG. 8), residing in computer readable medium, such as for example computer readable medium 830 (FIG. 8), wherein those instructions are executed by a processor, such as processor 822 (FIG. 8), to perform one or more of steps 130, 140, 150, 160, 170, 175, 180, 185, and/or 190, recited in FIG. 1, and/or one or more of steps 910, 915, 920, 925, 930, 935, 940, 045, 950, 955, 960, 965, 970 and/or 980, recited in FIG. 9, and/or one or more of steps 1010, 1020, 1030, 1040, and/or 1050, recited in FIG. 10, and/or one or more of steps 1110, 1120, 1130, 1140, and/or 1150, recited in FIG. 11, and/or one or more of steps 1210, 1220, 1230, 1240, and/or 1250, recited in FIG. 12.

In other embodiments, Applicants' invention includes instructions residing in any other computer program product, where those instructions are executed by a computing device external to, or internal to, tape drive apparatus 800 (FIG. 8), to perform one or more of steps 130, 140, 150, 160, 170, 175, 180, 185, and/or 190, recited in FIG. 1, and/or one or more of steps 910, 915, 920, 925, 930, 935, 940, 045, 950, 955, 960, 965, 970 and/or 980, recited in FIG. 9, and/or one or more of steps 1010, 1020, 1030, 1040, and/or 1050, recited in FIG. 10, and/or one or more of steps 1110, 1120, 1130, 1140, and/or 1150, recited in FIG. 11, and/or one or more of steps 1210, 1220, 1230, 1240, and/or 1250, recited in FIG. 12. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write information to a tape storage medium, comprising the steps of:

disposing a tape storage medium comprising a nominal storage capacity in a tape drive apparatus comprising a write head and a buffer;

moving said tape storage medium in a first direction;

writing data from said buffer to said tape storage medium;

emptying said buffer while said tape storage medium is moving in said first direction;

determining by said tape drive, while said tape storage medium is moving in said first direction, whether to enable a backhitchless write wherein said tape storage medium is not stopped and moved in a second and opposition direction, prior to writing new data to said tape storage medium;

wherein said backhitchless write eliminates a time overhead required to stop said tape storage medium and to move said tape storage medium in a reverse direction to reposition said write head, and wherein use of said backhitchless write does not adversely impact said nominal storage capacity;

wherein said determining step further comprises the steps of:

determining a nominal storage capacity (C) for said tape storage medium;

determining a Longitudinal Tape Length (L) for said tape storage medium;

determining a Current Wrap Number for said write head;

determining a Current Longitudinal Position for said write head;

calculating a value for a current position (X) of said write head, wherein $(X)=((L)*(\text{Current Wrap Number}))+\text{Current Longitudinal Position}$;

calculating a value for an expected capacity on current location (S), wherein $(S)=(X/L)*(\text{Total Wrap Number})*(C)$;

determining a current Dataset Number (N);

determining a Dataset Size;

calculating a value for an actual capacity on current location (R), wherein $(R)=(N)*\text{Dataset Size}$;

based upon said expected capacity on current location and based upon said actual capacity on current location, determining whether to enable said backhitchless write.

2. The method of claim 1, further comprising the steps of:

establishing a value for Alpha;

establishing a value for Beta;

determining whether $((R)-(S)*\text{Beta})+\text{Alpha}$ is greater than 0;

operative if $((R)-(S)*\text{Beta})+\text{Alpha}$ is greater than 0, enabling said backhitchless write.

3. The method of claim 1, wherein said determining step further comprises the steps of:
establishing a backhitchless threshold count;
determining an actual backhitchless write count;
determining if said actual backhitchless write count is greater than said backhitchless threshold count;
operative if said actual backhitchless write count is not greater than said backhitchless threshold count, enabling said backhitchless write.

4. The method of claim 1, wherein said determining step further comprises the steps of:
establishing an error rate threshold;
determining an actual error rate;
determining if said actual error rate is greater than said error rate threshold;
operative if said actual error rate is not greater than said error rate threshold, enabling said backhitchless write.

5. The method of claim 1, wherein said determining step further comprises the steps of:
establishing backhitchless write threshold interval;
determining an actual backhitchless write interval;
determining if said actual backhitchless write interval is greater than said backhitchless write threshold interval;
operative if said actual backhitchless write interval is greater than said backhitchless write threshold interval, enabling said backhitchless write.

6. The method of claim 1, further comprising the steps of:
receiving new data;
writing said new data to said buffer;
determining if said buffer comprises sufficient new data to begin writing said new data to said tape storage medium.

7. The method of claim 6, further comprising the steps of:
establishing and saving a Dataset Separation Threshold;
operative if said data buffer comprises sufficient new data to begin said new write operation, determining an Actual Distance between said write head and previously-written data;
determining if said Actual Distance is greater than said Dataset Separation Threshold;
operative if said Actual Distance is not greater than said Dataset Separation Threshold, writing said new data to said tape storage medium without stopping said tape storage medium to reposition said write head.

8. The method of claim 7, further comprising the steps of:
operative if said Actual Distance is greater than said Dataset Separation Threshold:
stopping said tape storage medium;
moving said tape storage medium in a second and opposition direction to reposition said write head adjacent the end of said current dataset;
moving said tape storage medium in said first direction;
writing said new data to said tape storage medium.

9. A tape drive apparatus comprising a write head, a buffer, and a computer readable medium comprising computer readable program code disposed therein to write information to a tape storage medium moveably disposed therein, wherein said tape storage medium comprises a nominal storage capacity, the computer readable program code comprising a series of computer readable program steps to effect:
moving said tape storage medium in a first direction;
writing data from said buffer to said tape storage medium;
emptying said buffer while said tape storage medium is moving in said first direction;
determining by said tape drive, while said tape storage medium is moving in said first direction, whether to enable a backhitchless write wherein said tape storage medium is not stopped and moved in a second and opposition direction, prior to writing new data to said tape storage medium;
wherein said backhitchless write eliminates a time overhead required to stop said tape storage medium and to move said tape storage medium in a reverse direction to reposition said write head, and wherein use of said backhitchless write does not adversely impact said nominal storage capacity;
wherein said computer readable program code to determine whether to enable a backhitchless write further comprises a series of computer readable program steps to effect:
determining a nominal storage capacity (C) for said tape storage medium;
determining a Longitudinal Tape Length (L) for said tape storage medium;
determining a Current Wrap Number for said write head;
determining a Current Longitudinal Position for said write head;
calculating a value for a current position (X) of said write head, wherein $(X)=((L)*(\text{Current Wrap Number}))+\text{Current Longitudinal Position}$;

calculating a value for an expected capacity on current location (S), wherein $(S)=(X/L)*(\text{Total Wrap Number})*(C)$;

determining a current Dataset Number (N);
determining a Dataset Size;
calculating a value for an actual capacity on current location (R), wherein $(R)=(N)*\text{Dataset Size}$;

retrieving a pre-determined value for Alpha;
retrieving a pre-determined value for Beta;
determining if $((R)-(S)*\text{Beta})+\text{Alpha}$ is greater than 0;
operative if $((R)-(S)*\text{Beta})+\text{Alpha}$ is greater than 0, enabling said backhitchless write.

10. The tape drive apparatus of claim 9, wherein said computer readable program code to determine whether to enable a backhitchless write further comprises a series of computer readable program steps to effect:
retrieving a pre-determined backhitchless threshold count;
determining an actual backhitchless write count;
determining if said actual backhitchless write count is greater than said backhitchless threshold count;
operative if said actual backhitchless write count is not greater than said backhitchless threshold count, enabling said backhitchless write.

11. The tape drive apparatus of claim 9, wherein said computer readable program code to determine whether to enable a backhitchless write further comprises a series of computer readable program steps to effect:
retrieving a pre-determined error rate threshold;
determining an actual error rate;
determining if said actual error rate is greater than said error rate threshold;
operative if said actual error rate is not greater than said error rate threshold, enabling said backhitchless write.

12. The tape drive apparatus of claim 9, wherein said computer readable program code to determine whether to enable a backhitchless write further comprises a series of computer readable program steps to effect:
retrieving a pre-determined backhitchless write threshold interval;

determining an actual backhitchless write interval;
determining if said actual backhitchless write interval is greater than said backhitchless write threshold interval;
operative if said actual backhitchless write interval is greater than said backhitchless write threshold interval, enabling said backhitchless write.

13. The tape drive apparatus of claim 9, said computer readable program code further comprising a series of computer readable program steps to effect:
receiving new data;
writing said new data to said data buffer;
determining if said data buffer comprises sufficient new data to begin writing new data to said tape storage medium.

14. The tape drive apparatus of claim 13, said computer readable program code further comprising a series of computer readable program steps to effect:
operative if said data buffer comprises sufficient data to begin writing new data to said tape storage medium, retrieving a pre-determined Dataset Separation Threshold;
determining an Actual Distance between said write head and previously-written data;
determining if said Actual Distance is greater than said Dataset Separation Threshold;
operative if said Actual Distance is not greater than said Dataset Separation Threshold, writing said new data to said tape storage medium without stopping said tape storage medium to reposition said write head adjacent previously-written data.

15. The tape drive apparatus of claim 14, said computer readable program code further comprising a series of computer readable program steps to effect:
operative if said Actual Distance is greater than said Dataset Separation Threshold:
stopping said tape storage medium;
moving said tape storage medium in a second and opposite direction;
repositioning said write head adjacent previously-written data;
moving said tape storage medium in said first direction;
writing said new data to said tape storage medium.

16. A computer program product encoded in a non-transitory computer readable medium wherein said commuter program product is usable with a computer processor to write information to a tape storage medium moveably disposed in a tape drive apparatus comprising a write head and a data buffer, wherein said tape storage medium comprises a nominal storage capacity, comprising:
computer readable program code which causes said programmable computer processor to move said tape storage medium in a first direction;
computer readable program code which causes said programmable computer processor to write data from said buffer to said tape storage medium, and thereby empty said buffer while said tape storage medium is moving in said first direction;
computer readable program code which causes said programmable computer processor to determine, while said tape storage medium is moving in said first direction, whether to enable a backhitchless write wherein said tape storage medium is not stopped and moved in a second and opposition direction, prior to writing new data to said tape storage medium;
wherein said backhitchless write eliminates a time overhead required to stop said tape storage medium and to move said tape storage medium in a reverse direction to reposition said write head, and wherein use of said backhitchless write does not adversely impact said nominal storage capacity;
wherein said computer readable program code which causes said programmable computer processor to determine whether to enable a backhitchless write protocol further comprises:
computer readable program code which causes said programmable computer processor to determine a nominal storage capacity (C) for said tape storage medium;
computer readable program code which causes said programmable computer processor to determine a Longitudinal Tape Length (L) for said tape storage medium;
computer readable program code which causes said programmable computer processor to determine a Current Wrap Number for said write head;
computer readable program code which causes said programmable computer processor to determine a Current Longitudinal Position for said write head;
computer readable program code which causes said programmable computer processor to calculate a value for a current position (X) of said write head, wherein $(X)=((L)*(\text{Current Wrap Number}))+\text{Current Longitudinal Position}$;

computer readable program code which causes said programmable computer processor to calculate a value for an expected capacity on current location (S), wherein $(S)=(X/L)*(\text{Total Wrap Number})*(C)$;

computer readable program code which causes said programmable computer processor to determine a current Dataset Number (N);
computer readable program code which causes said programmable computer processor to determine a Dataset Size;
computer readable program code which causes said programmable computer processor to calculate a value for an actual capacity on current location (R), wherein $(R)=(N)*\text{Dataset Size}$;

computer readable program code which causes said programmable computer processor to retrieve a pre-determined value for Alpha;
computer readable program code which causes said programmable computer processor to retrieve a pre-determined value for Beta;
computer readable program code which causes said programmable computer processor to determine if ((R)−(S)*Beta)+Alpha is greater than 0;
computer readable program code which, if ((R)−(S)*Beta)+Alpha is greater than 0, causes said programmable computer processor to enable said backhitchless write.

17. The computer program product of claim 16, wherein said computer readable program code which causes said programmable computer processor to determine whether to enable a backhitchless write protocol further comprises:
computer readable program code which causes said programmable computer processor to retrieve a pre-determined backhitchless threshold count;
computer readable program code which causes said programmable computer processor to determine an actual backhitchless write count;
computer readable program code which causes said programmable computer processor to determine if said actual backhitchless write count is greater than said backhitchless threshold count;

computer readable program code which, if said actual backhitchless write count is not greater than said backhitchless threshold count, causes said programmable computer processor to enable said backhitchless write.

18. The computer program product of claim 16, wherein said computer readable program code which causes said programmable computer processor to determine whether to enable a backhitchless write protocol further comprises:

computer readable program code which causes said programmable computer processor to retrieve a pre-determined error rate threshold;

computer readable program code which causes said programmable computer processor to determine an actual error rate;

computer readable program code which causes said programmable computer processor to determine if said actual error rate is greater than said error rate threshold;

computer readable program code which, if said actual error rate is not greater than said error rate threshold, causes said programmable computer processor to enable said backhitchless write.

19. The computer program product of claim 16, wherein said computer readable program code which causes said programmable computer processor to determine whether to enable a backhitchless write protocol further comprises:

computer readable program code which causes said programmable computer processor to retrieve a pre-determined backhitchless write threshold interval;

computer readable program code which causes said programmable computer processor to determine an actual backhitchless write interval;

computer readable program code which causes said programmable computer processor to determine if said actual backhitchless write interval is greater than said backhitchless write threshold interval;

computer readable program code which, if said actual backhitchless write interval is greater than said backhitchless write threshold interval, causes said programmable computer processor to enable said backhitchless write.

20. The computer program product of claim 16, said computer readable program code further comprising a series of computer readable program steps to effect:

computer readable program code which causes said programmable computer processor to receive new data;

computer readable program code which causes said programmable computer processor to write said new data to said buffer;

computer readable program code which causes said programmable computer processor to determine if said data buffer comprises sufficient new data to begin writing said new data to said tape storage medium.

21. The computer program product of claim 20, further comprising:

computer readable program code which, if said data buffer comprises sufficient data to begin said new write operation, causes said programmable computer processor to retrieve a pre-determined Dataset Separation Threshold;

computer readable program code which causes said programmable computer processor to determine an Actual Distance between said write head and the end of previously written data;

computer readable program code which causes said programmable computer processor to determine if said Actual Distance is greater than said Dataset Separation Threshold;

computer readable program code which, if said Actual Distance is not greater than said Dataset Separation Threshold, causes said programmable computer processor to write said new dataset to said tape storage medium without stopping said tape storage medium to reposition said write head.

22. The computer program product of claim 21, further comprising:

computer readable program code which, if said Actual Distance is greater than said Dataset Separation Threshold, causes said programmable computer processor to:

stop said tape storage medium;

move said tape storage medium in a second and opposition direction to reposition said write head adjacent previously-written data.

* * * * *